(12) United States Patent
Adkins et al.

(10) Patent No.: US 8,164,456 B2
(45) Date of Patent: Apr. 24, 2012

(54) DEVICE FOR INCREMENTALLY ADJUSTING THE POSITION OF AN RFID TAG

(75) Inventors: Jason Michael Adkins, Scott Depot, WV (US); Charles Christopher Asebes, Salt Rock, WV (US); Sudhakar Pillarisetti, Scott Depot, WV (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 450 days.

(21) Appl. No.: 12/418,666

(22) Filed: Apr. 6, 2009

(65) Prior Publication Data
US 2010/0253474 A1    Oct. 7, 2010

(51) Int. Cl.
*G08B 13/14* (2006.01)
(52) U.S. Cl. ..................................... 340/572.1
(58) Field of Classification Search .... 340/572.1–572.9; 235/492
See application file for complete search history.

(56) References Cited

U.S. PATENT DOCUMENTS

| | | | |
|---|---|---|---|
| 5,973,599 A | 10/1999 | Nicholson et al. | |
| 6,100,804 A | 8/2000 | Brady et al. | |
| 7,088,249 B2 | 8/2006 | Senba et al. | |
| 7,327,266 B2 * | 2/2008 | Watanabe et al. | 340/572.8 |
| 2006/0038682 A1* | 2/2006 | Reyes et al. | 340/572.1 |
| 2007/0108296 A1* | 5/2007 | Konopka et al. | 235/492 |

\* cited by examiner

*Primary Examiner* — Phung Nguyen
(74) *Attorney, Agent, or Firm* — Gifford, Krass, Sprinkle, Anderson & Citkowski, P.C.

(57) ABSTRACT

A device for incrementally adjusting the position of an RFID tag includes a base, and a lid releasably attachable to said base. The base includes a generally planar surface in which a plurality of locators are formed at regular intervals. A portion of the RFID tag is received by one of the plurality of locators for incrementally adjusting of the position of the RFID tag. The plurality of locators extend collinearly and are formed overlapping so that the position of the RFID tag is adjustable in increments less than the overall length of the RFID tag.

17 Claims, 2 Drawing Sheets

DEVICE FOR INCREMENTALLY ADJUSTING THE POSITION OF AN RFID TAG

FIELD OF THE INVENTION

The present invention relates generally to the positioning of a radio frequency identification (RFID) tag. More specifically, to a device for incrementally adjusting the position of an RFID tag.

BACKGROUND OF THE INVENTION

RFID systems which utilize RFID tags to convey information to a reader are well known in the art. One such system uses RFID tags to control the operation of all automated vehicle. The RFID tags are embedded along the path, usually a concrete roadway or a factory floor, at predetermined checkpoints where the operation of the automatic vehicle is altered. The checkpoints represent the locations where the automated vehicle is required to stop, start, change speed, turn, or perform any other type of action.

As such, the RFID tag is required to be precisely embedded at a specific location along automated vehicle's path. Once embedded, it is desirable to be able to fine tune the position of the RFIG tag to optimize the operation, or, in the event of a defective RFID tag, to replace the RFID tag. However, previously known methods of embedding an RFID tag do not allow for any adjustability of the position of the RFID tag once it has been embedded.

One such method requires a hole to be drilled in the path of the automated vehicle. The diameter of the hole is slightly larger than the RFID tag allowing the RFID tag to be placed inside. A layer of epoxy is applied over the tag to secure the REID tag in place and to acts as a sealant to protect the RFID tag. The hole must be sufficiently deep enough so that there is a sufficient amount of epoxy above the RFID tag to protect it from external contamination and the force of the automated vehicle running over it. Once the RFID tag is installed it is unable to be moved. As such, the current method of embedding an RFID tag allows for zero adjustability of the position of the REID tag resulting in an inability to fine tune the path of the automated vehicle.

Thus, there exists a need for a device for embedding an RFID tag into a path, while allowing for a degree of adjustability in the position of the RFID tag.

SUMMARY OF THE INVENTION

The present invention provides a device for embedding an RFID tag which overcomes the above-mentioned disadvantages of the previously known methods.

In brief, a device for incrementally adjusting the position of an REID tag includes a base having a generally planar surface and a plurality of locators which receives a portion of the RFID tag. The plurality of locators are positioned at regular intervals allowing for the position of the REID tag to be incrementally adjusted. A lid is releasably attached to the base to protect the RFID tag from external contaminates and forces.

In one embodiment, the plurality of locators are a plurality of recesses formed in the generally planar surface. The plurality of locators formed in a corresponding shape to the RFID tag so as to receive a portion of the RFID tag. To allow for adjusting the REID tags in increments less than the overall length of the RFID tag, the plurality of recesses are formed in an overlapping manner.

DETAILED DESCRIPTION OF THE INVENTION

The present invention has utility as a device for incrementally adjusting the position of an RFID tag. By providing a base having a plurality of locators which receive a portion of an RFID tag the position of the REID tag may be quickly and easily adjusted in predetermined increments.

Figure 1:
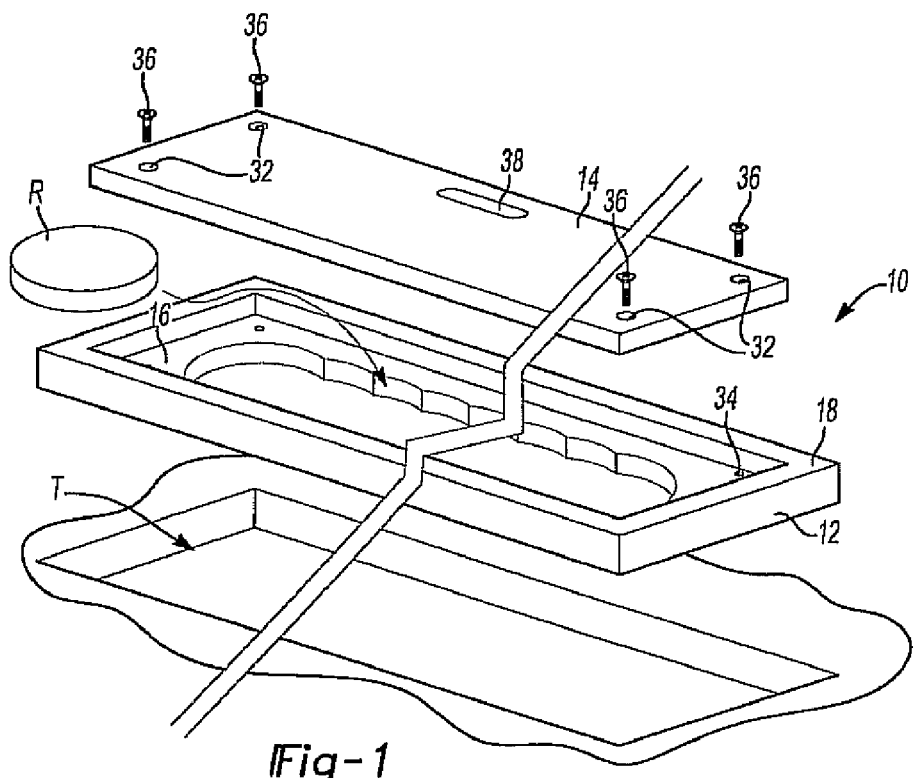
FIG. 1 is an exploded perspective view illustrating a preferred embodiment of the present invention.

With reference to FIG. 1, an inventive device for incrementally adjusting the position of an RFID tag is generally illustrated at 10. The device 10 includes a base 12 and a lid 14 which are preferably made of a nylon material, or any other suitable non-metallic material so as to avoid interfering with the RFID signal. The base 12 has a generally planar section surface 16, a longitudinal axis, and an outwardly extending lip 18 bounding the perimeter of the planar section 16. A plurality of recesses, or cutouts, 24 extend from a top surface 20 towards a bottom surface 22 of the generally planar surface 16. The recesses 24 do not extend entirely through the generally planar surface resulting in a portion of the base 12 remaining between the recesses 24 and the bottom surface 22, as seen in FIG. 3.

Figure 2:
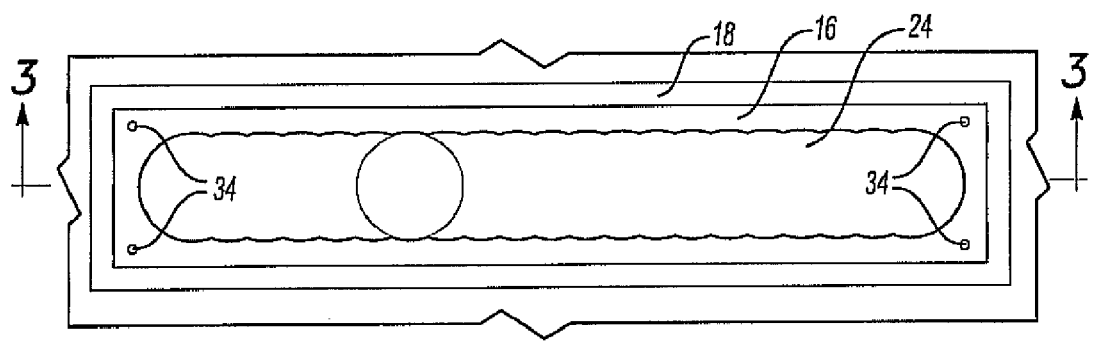
FIG. 2 is top elevational view illustrating the preferred embodiment of the present invention.

Referring to FIG. 2 the recesses 24 are formed in a corresponding shape to the RFID tag R so as to receive a portion of the RFID tag R. The recesses 24 are slightly deeper than the height of the RFID tag R, and extend collinearly along the longitudinal direction of the base 12. The increment in which the RFID tag R is adjustable is selectable according to the requirements of the application. In addition, the recesses 24 are, optionally, formed in an overlapping manner so that the position of the RFID tag R is adjustable in increments less than the overall length (i.e., diameter in the case of a circular RFID tag) of the RFID tag R. Each of the recesses 24 has a center positioned on the longitudinal axis.

Figure 3:
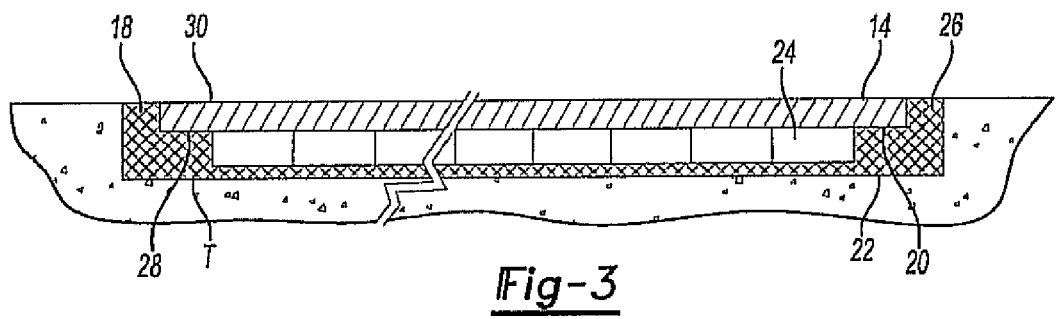
FIG. 3 is a cross sectional view taken along the line 3-3 of FIG. 2.

FIG. 3 illustrates the device 10 when embedded into a floor surface. A trough T dimensioned to receive the base 12 is formed in the floor surface. The trough T has a depth equal to that of the height of the base from the bottom surface 22 to a top surface 26 of the lip 18, such that when the base 12 is embedded in the trough T the top surface 26 of the lip 18 is flush with the floor surface. The base 12 may be fixedly or releasably fastened into trough T by any means known to those of ordinary skill in the art such as adhesive, epoxy, screw, bolt, or any other type of suitable fastener.

The lid 14 has a thickness equal to that of the height of the lip 18 such that when the bottom surface 28 of the lid 14 is in contact with top surface 20 of generally planar surface 16 the top surface 30 of the lid 14 is flush with the top surface 26 of the lip 18 and the floor surface. In this manner the device 10 protects the RFID tag R from external containments and forces such as the weight of vehicle passing thereover the device 10. The remaining portion of the generally planar surface 16 which has not been recessed acts as a support for the lid 14, allowing any downward force acting on the lid 14 to be displaced by the generally planar surface 16 rather than the RFID tag R.

A number of throughbores 32 are disposed in the lid 14, preferably located in each of the corners of the lid 14. The generally planar surface 16 includes bores 34 which correspond in location to the through bores 32. The lid 14 is secured to the base 12 by screws 36 which extend through the through bores 32 and into bores 34 of the base, thereby releasably securing the lid 14 to the base 12. It is appreciated, that the lid 14 may be secured to base 12 by any other means known in the art to releasably secure one object to another such as an adhesive, epoxy, snap tabs, bolt, or any other suitable type of fastener. In addition, the lid 14 includes a pry hole 33 dimensioned to receive a pry member, such as a screwdriver. The pry hole 38 allows the user to quickly and easily remove the lid 14 from the base once the screws 36 have been removed.

Figure 4:
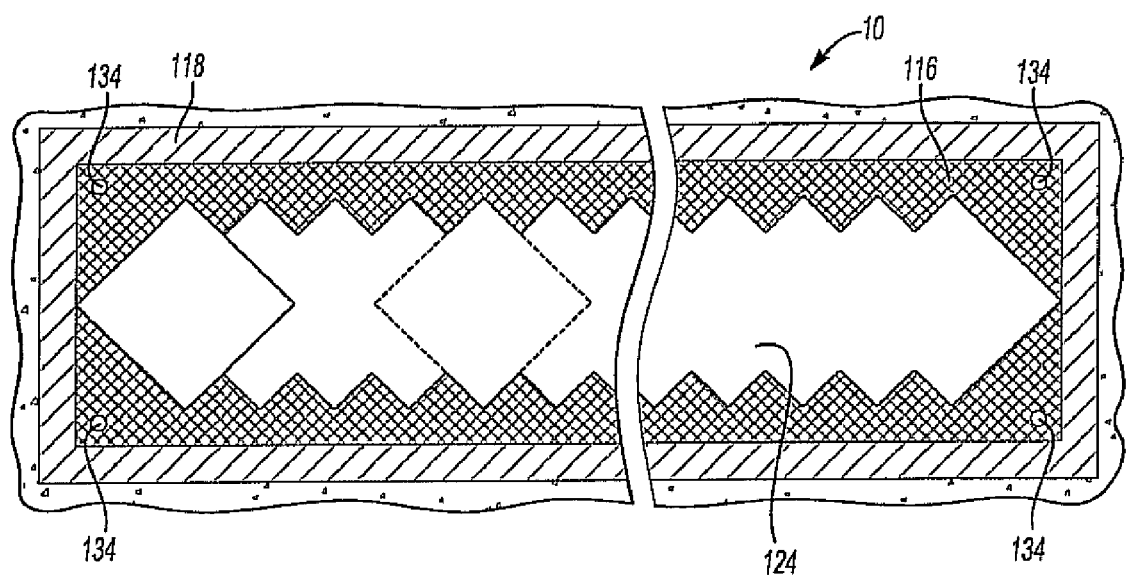
FIG. 4 is a top elevational view illustrating a second embodiment of the present invention.

As seen in FIGS. 1-3, the recesses 24 are dimensioned to receive a portion of the circular RFID tag R; however, the invention is not limited to use with a circular RFID tag R. FIG. 4 illustrates device 110 which is similar in all means to device 10 except the shape of the recesses. Device 110 is designed for incrementally adjusting the position of an RFID tag having a generally square shape. It will be appreciated that the recesses can be formed to accommodate virtually all shapes in which RFID tags are available, including circular, square, rectangular and octagonal.

Figure 5:
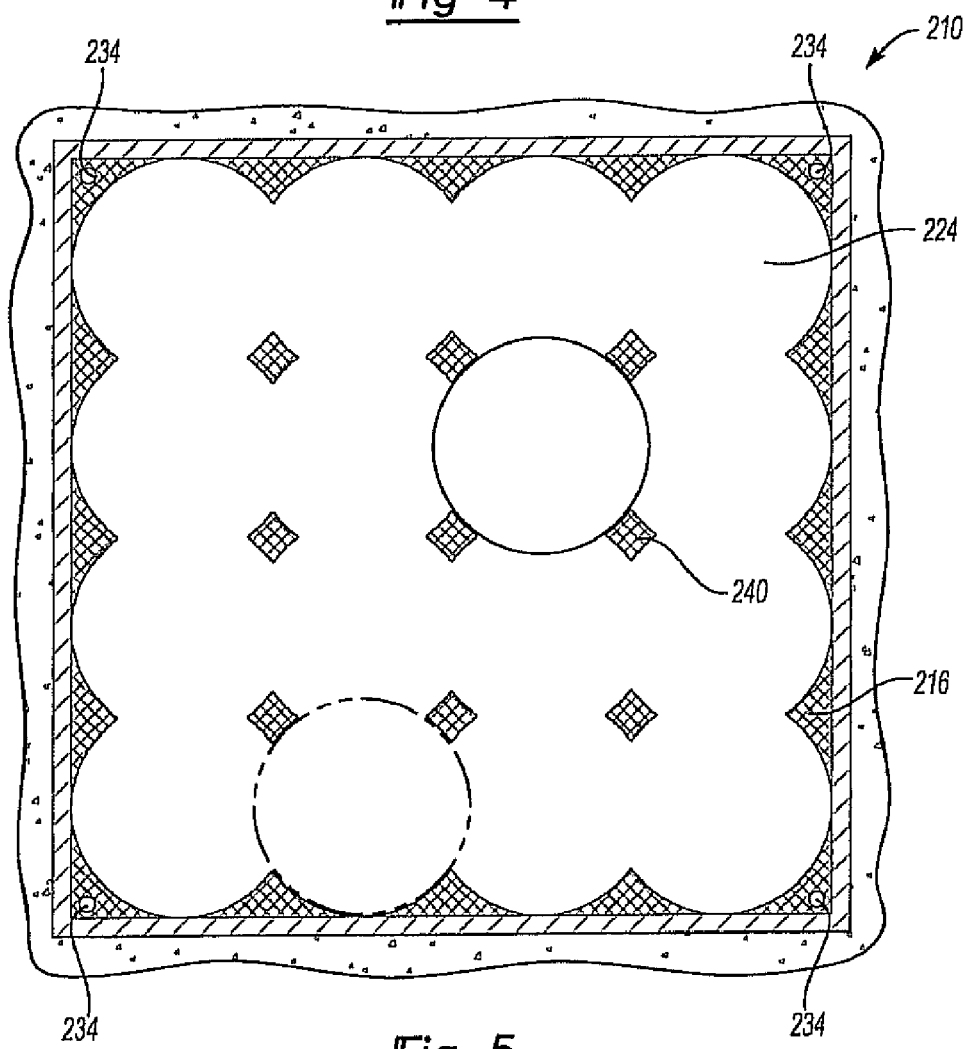
FIG. 5 is a top elevational view illustrating a third embodiment of the present invention.

Referring now to FIG. 5 which illustrates a device 210 similar in all aspects to devices 10 and 110 except in the location of the recesses 24. Device 210 includes a plurality of recesses 224 which overlap in a grid-shaped manner such that the location of the RFID tag R is adjustable along the longitudinal axis and a second axis traverse to the longitudinal axis. As the recesses 224 extend in two different directions the inner recesses and the recesses along the perimeter of the generally planar surface 216 form a plurality of supports 240. The supports 240 are used to hold the RFID tag R in its selected position, and act as struts for supporting the bottom surface of the lid (not shown). It will be appreciated that the recesses 224 of device 210 may be formed to receive a portion of an RFID tag having a square, rectangular or octagonal shape.

From the foregoing, it can be seen that the present invention provides a device for incrementally adjusting the position of an RFID tag. Having described the invention, however, many modifications thereto will become apparent to those skilled in the art to which it pertains without deviation from the spirit of the invention as defined by the scope of the appended claims.

It is claimed:

1. A device for incrementally adjusting the position of an RFID tag, said device comprising:
    a base having a generally planar surface and a longitudinal axis;
    a plurality of recesses formed in said planar surface, said recesses are dimensioned to receive at least a portion of the RFID tag, each one of said plurality of recesses having a center positioned on said longitudinal axis and positioned at regular intervals for incrementally adjusting the position of the RFID tag; and
    a lid releasably attachable to said base.

2. The device of claim 1, wherein said device is embedded within a floor, and wherein a top surface of said lid extends flush with the floor.

3. The device of claim 2, wherein said plurality of recesses overlap so that the position of the RFID tag is adjustable in increments less than the overall length of the RFID tag.

4. The device of claim 2, wherein a second plurality of recesses extend along a second axis, said second axis being traverse to said longitudinal axis.

5. The device of claim 4, wherein said second plurality of recesses overlap in said longitudinal axis and said second axis so that the position of the RFID tag is adjustable in increments less than the overall length of the RFID tag along said longitudinal axis and said second axis.

6. The devices of claim 5, wherein unrecessed portions of said planar surface form a plurality of supports to contain the RFID tag within said plurality of recesses.

7. The device of claim 1, wherein said base has an outwardly extending lip bounding a perimeter of said planar surface, said outwardly extending lip having a predetermined height.

8. The device of claim 7, wherein said lid has a top surface and a bottom surface, and wherein said lid has a thickness equal to that of said predetermined height of said lip such that when said lid is attached to said base said bottom surface of said lid is adjacent to said planar surface and said top surface of said lid is flush with said lip.

9. The device of claim 1, wherein said base and said lid are composed of a non-metallic material.

10. The device of claim 1, wherein said plurality of locators are a plurality of recesses formed in said planar surface, and wherein each of said plurality of recesses are dimensioned to receive a portion of the RFID tag.

11. A device for incrementally adjusting the position of an RFID tag relative to a floor surface having a trench, said device comprising:
    a base having a generally planar surface and a longitudinal axis, said base being disposed within the trench formed in the floor surface;
    a plurality of locators formed to receive at least a portion of the RFID tag, each one of said plurality of locators having a center positioned on said longitudinal axis and positioned at intervals for incrementally adjusting the position of the RFID tag; and
    a lid having a top surface, said lid being releasably attachable to said base such that said top surface extends flush with the floor surface.

12. The device of claim 11, wherein said base has an outwardly extending lip having an upper surface, said outwardly extending lid bounding a perimeter of said planar surface, said outwardly extending lip having a predetermined height.

13. The device of claim 12, wherein said lid includes a bottom surface opposite said top surface, and wherein said lid has a thickness equal to that of said predetermined height of said lip such that when said lid is attached to said base said bottom surface of said lid is adjacent to said planar surface and said top surface of said lid and said upper surface of said lip extend flush the floor surface.

14. The device of claim 11, wherein said base and said lid are composed of a non-metallic material.

15. The device of claim 11, wherein a second plurality of recesses extend along a second axis, said second axis being traverse to said longitudinal direction.

16. The device of claim 15, wherein said plurality of recesses and said second plurality of recesses overlap in said longitudinal axis and said second axis so that the position of the RFID tag is adjustable in increments less than the overall length of the RFID tag along said longitudinal axis and said second axis.

17. The devices of claim 16, wherein unrecessed portions of said planar surface form a plurality of supports to contain the RFID tag within said plurality of recesses and said second plurality of recesses.

* * * * *

UNITED STATES PATENT AND TRADEMARK OFFICE
CERTIFICATE OF CORRECTION

PATENT NO. : 8,164,456 B2  
APPLICATION NO. : 12/418666  
DATED : April 24, 2012  
INVENTOR(S) : Jason Michael Adkins et al.

Page 1 of 1

It is certified that error appears in the above-identified patent and that said Letters Patent is hereby corrected as shown below:

In the Specification

At column 1, line number 15, Delete "all", Insert --an--

At column 1, line number 35, Delete "REID", Insert --RFID--

At column 1, line number 35, Delete "acts", Insert --act--

At column 1, line number 42, Delete "REID", Insert --RFID--

At column 1, line number 54, Delete "an", Insert --a--

At column 1, line number 54, Delete "REID", Insert --RFID--

At column 1, line number 57, Delete "REID", Insert --RFID--

At column 1, line number 65, Delete "REID", Insert --RFID--

At column 2, line number 18, Delete "REID", Insert --RFID--

At column 2, line number 25, Delete "section"

At column 3, line number 9, Delete "33", Insert --38--

Signed and Sealed this  
Third Day of June, 2014

Michelle K. Lee  
*Deputy Director of the United States Patent and Trademark Office*